Figure 1:
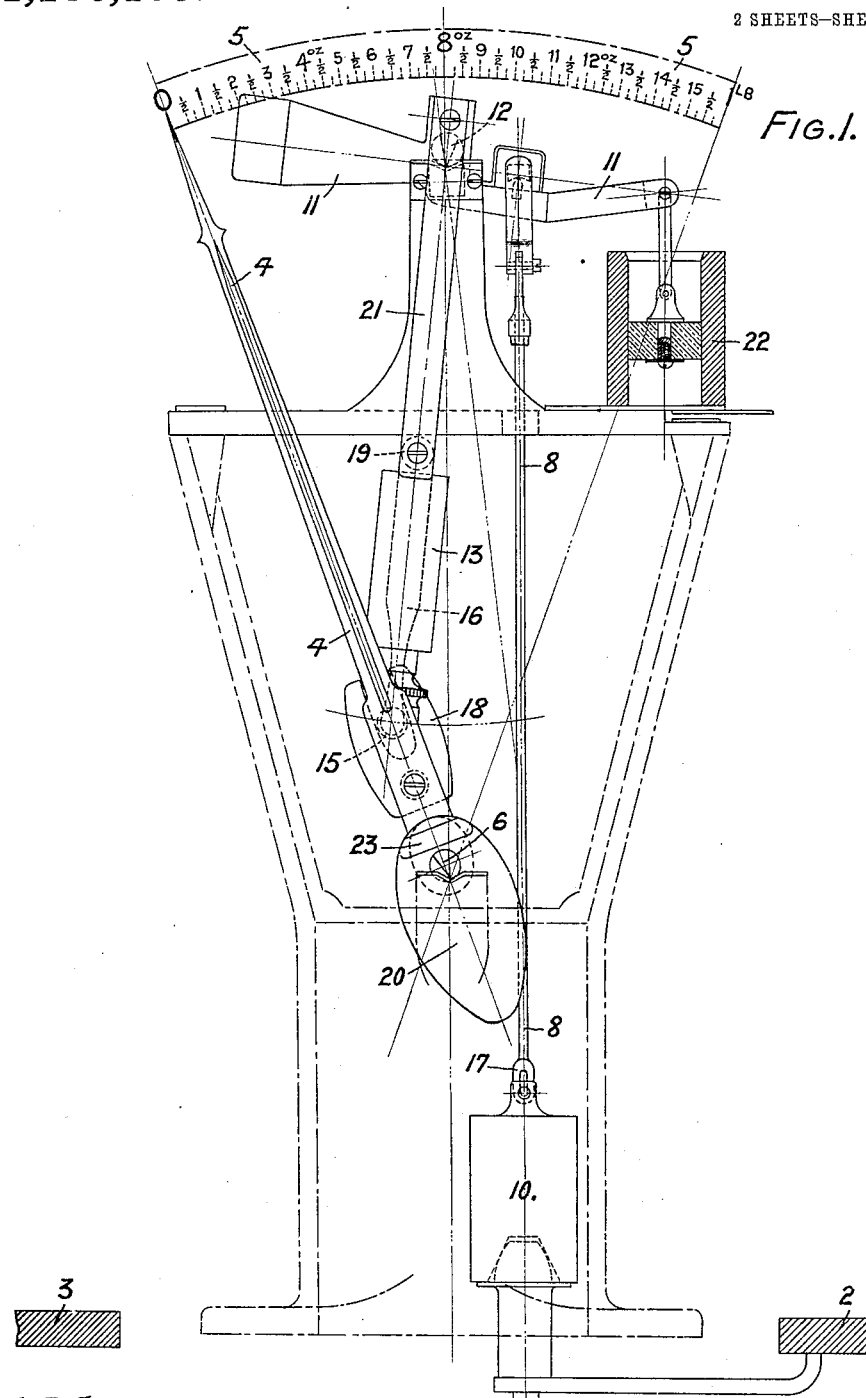

J. DOBSON.
WEIGHING MACHINE.
APPLICATION FILED FEB. 26, 1914.

1,130,155.

Patented Mar. 2, 1915.

2 SHEETS—SHEET 1.

Witnesses
Floyd R. Cornwall
F. M. Meyer

Inventor
J. Dobson
By _____ Atty.

J. DOBSON.
WEIGHING MACHINE.
APPLICATION FILED FEB. 26, 1914.
1,130,155.
Patented Mar. 2, 1915.
2 SHEETS—SHEET 2.
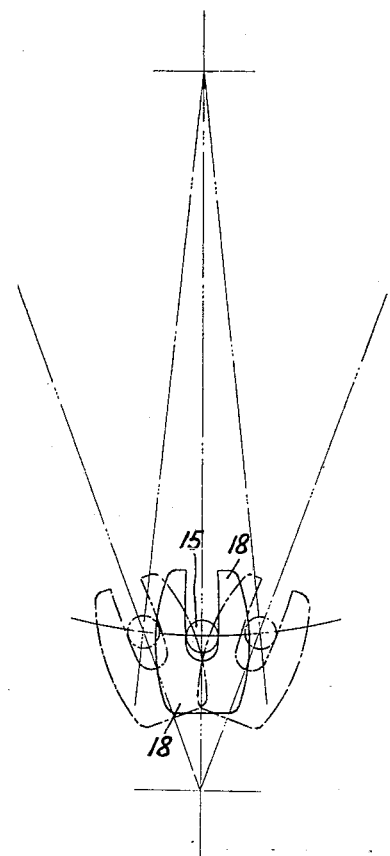
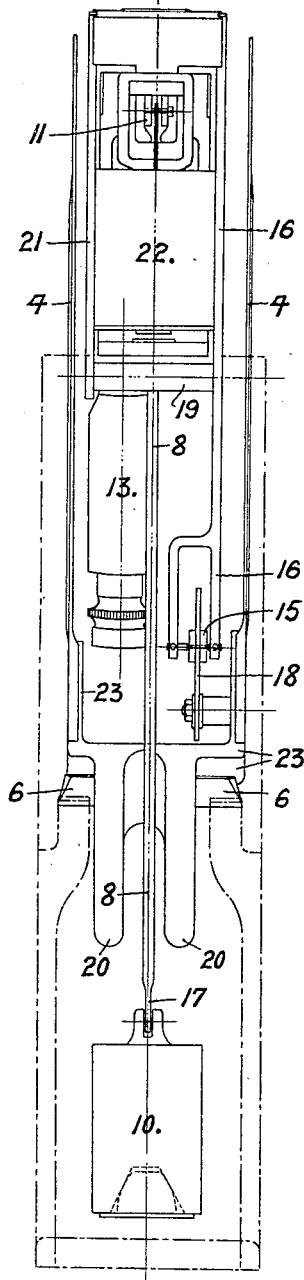

UNITED STATES PATENT OFFICE.

JAMES DOBSON, OF BIRMINGHAM, ENGLAND, ASSIGNOR TO HENRY POOLEY AND SON LIMITED (INCORPORATED 1914), OF BIRMINGHAM, ENGLAND.

WEIGHING-MACHINE.

1,130,155. Specification of Letters Patent. Patented Mar. 2, 1915.

Application filed February 26, 1914. Serial No. 821,139.

*To all whom it may concern:*

Be it known that I, JAMES DOBSON, a subject of the King of England, residing at Birmingham, in the county of Warwick, England, have invented new and useful Improvements in Weighing-Machines, of which the following is a specification.

This invention has reference to weighing machines; and more particularly those adapted for use on shop counters, or under like conditions or for similar purposes, for weighing comparatively small quantities of goods; and it relates more particularly, furthermore, to a type of such machine wherein a part of the load is indicated on or by a scale, automatically, by the machine, and a movable pendulous resistance weight is used which varies in resistance according to its position, and which, plus another weight applied to the weight pan, will balance the load. The use of pendulous resistance weights in machines of this character naturally brings about the necessity of irregular graduations of the index or scale, which in many cases, and for certain reasons, is objectionable; and in weighing apparatus or scales of the character concerned, having these pendulous resistant weights, this defect has been obviated, and a scale or index or uniform graduation has been obtained by the use of cams in connection with the weight indicating mechanism, over which straps or the like, on which the load comes, and through which it is transferred to the beam, work. This method or means, however, of remedying the defect or objection referred to, is in itself objectionable; and the object of the invention is to provide a weighing machine or scale of the kind referred to in which, while the index or scale can have its graduations uniform, the latter objections to the use of cams, straps and the like, and their inherent drawbacks and effects, are obviated. In this machine, the irregularities of pendulous resistant weighing machines of the kind referred to are corrected at the point of connection or action of the beam or part connected with it, and the pointer or indicating device, which the beam or part operates. Namely, in this machine, a part connected with the beam operates upon a part of or connected with the pointer or indicator; and as this part swings over in the weighing action, or vibrates, it moves the pointer; and the parts are so arranged that for a given amount of movement of the vibrating part moving with the beam and resistant weight in different parts of its whole movement, a non-uniform or corresponding movement is produced upon the part of or connected with the pointer or indicator which is so acted upon. Thus, this irregular or non-uniform movement so imparted, renders unnecessary the irregular graduation of the weight indicating scale, and prevents the irregular movement of the pointer or indicator which would otherwise take place, for each increment of load; and thereby the equal movement of the pointer for an equal increment of load, is accomplished, and in consequence an index scale having equal divisions or graduations, is rendered possible.

The invention will be further described with the aid of the accompanying drawings.

All the main parts and mode of action of the machine shown are well known and form *per se* no part of the present invention.

In the drawings, Figure 1 is a side elevation of the machine; Fig. 2 an end view; and Fig. 3 a diagram illustrating a part of it.

In the drawings, 2 represents the scale weight pan; 3 is the goods pan; 4 is the indicating pointer, pivoted at 6; and 5 the weight scale over which it works.

10 is the constant weight which works in connection with the weight pan 2; and the indicating mechanism.

11 is the beam or lever, pivoted on the knife edges 12, which the weight 10 operates upon and works in connection with; and 13 is the pendulous resistant weight connected with and carried from the lever or beam 11.

A free movement means is provided in the connecting part 8, connected with the weight 10, and consists of the elongated slotted end 17, by which the weight 10 is connected to the suspended rod 8.

The indicating arm or pointer 4 is provided below its knife edge pivot 6 with a weight or mass 20, which also constitutes a resistance weight; and in the case shown, constitutes a portion of the total resistance; but this is not essential to this invention.

As stated above, the correction of the irregular action above referred to, takes place at the spot or point of connection between the part which is connected with the beam 11, and the pointer 4; and this connecting part, in the case shown, consists of a roller 15, mounted on and carried by a bifurcated arm 16, fixed at the upper end to a part of the beam 11, and directly in line with the knife edge fulcrum 12; and a jaw 18 fixed on and moving with the pointer 4, within which jaw the roller 15 fits and works; so that as the beam 11 is moved, and the arm 16 moves, so the pointer will be moved. And the edges of this jaw, which the roller 15 works upon, will be given a suitable curve or formation; that is, a formation which is not a straight line as regards the active part or surface; and this irregular or uneven line or edge will produce the movement required in the pointer 4, so that for equal increments of load, it will move an equal distance; and the graduations therefore on the scale 5 will be likewise uniformly divided. Fig. 3 shows this jaw 18 in the central and two extreme positions. The pendulous resistance weight 13 is on the opposite side of the central plane of the machine to the bar 16; and is supported by a cross bar 19 fixed at one end to the bar 16, and at the other, to a bar 21 fixed to the beam 11, similarly as the bar 16.

22 is a dash-pot arrangement connected with the beam 11 for damping the vibrations and rendering the action of the weighing machine steady, or obviating a jerky action.

The machine shown has two pointers 4, one on each side, and these are fixed at their bases to the knife edge bar 16, which extends across the machine, and on to the inside of one portion of which, the jaw 18 is fixed, this jaw being more or less, as it were, a linear cam.

What is claimed is:—

1. In a weighing machine, the combination of a weight scale 5; a pointer 4; a beam 11; a pendulous resistance weight carried from the beam; a cam shaped device connected and moving with the pointer, and a part carried from the beam below its fulcrum, and operating in connection with this cam device; substantially as described.

2. In a weighing machine, the combination of a weight scale 5; a beam 11; a roller 15 on the lower end of same; a pointer 4; a cam device 18, connected with the pivoted pointer near the pivot thereof; substantially as described.

3. In a weighing machine the combination of a weight graduated scale, an indicator pivoted to the machine and working in conjunction with the graduated scale, a weight beam or lever carrying a resistance weight, a member carried by the beam and having a roller on its lower end, a slotted member carried by the indicator at a point above the pivot thereof, the said roller moving in the said slot whereby a given movement of the beam will transmit a different degree of movement to the pointer.

4. In a weighing machine the combination of a graduated weight scale, an indicator pivoted to the machine and adapted to move over the said scale, a weight beam carrying a resistance weight, a member carried by the beam and parallel to the resistance weight, the said member having a roller on its lower end, a slotted member carried by the indicator at a point above the pivotal point to form a fulcrum connection, the said roller moving the said slot, the parts arranged as and for the purpose described.

5. In a weighing machine the combination of a weight scale, a pointer, a beam, a pendulous resistance weight carried by the beam, a cam shaped device connected and moving with the pointer, and a member carried by the beam below its fulcrum and operating in connection with the said cam device the parts arranged as and for the purpose described.

In testimony whereof I have signed my name to this specification in the presence of two subscribing witnesses.

JAMES DOBSON.

Witnesses:
 SOMERVILLE GOODALL,
 MARGARET A. PLEWS.

Copies of this patent may be obtained for five cents each, by addressing the "Commissioner of Patents, Washington, D. C."